June 22, 1948.    J. A. LINKS    2,443,708
ENDLESS FILM MAGAZINE AND PROJECTOR
Filed Feb. 12, 1946
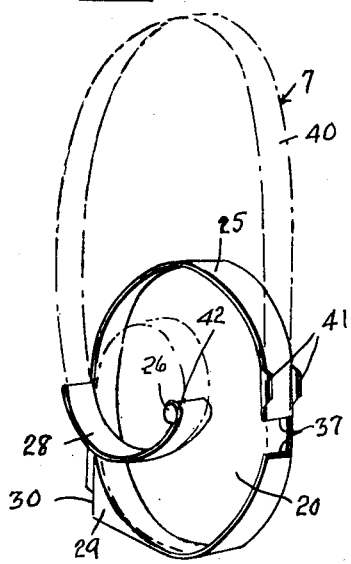
Fig. 2.
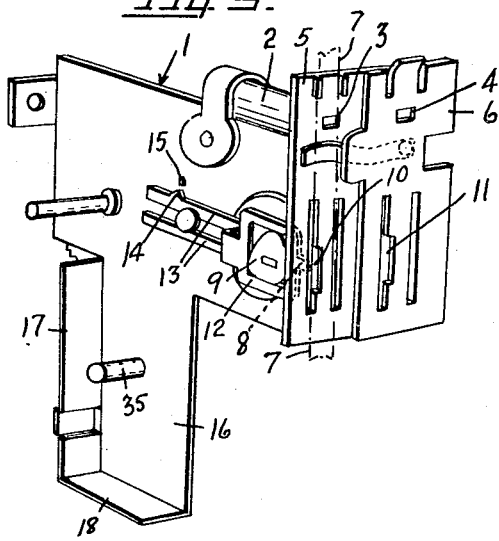
Fig. 3.
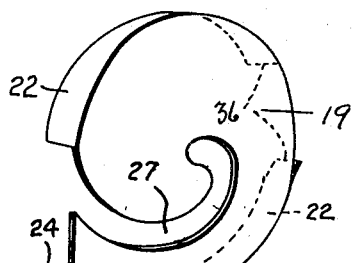
Fig. 4.
Fig. 5.
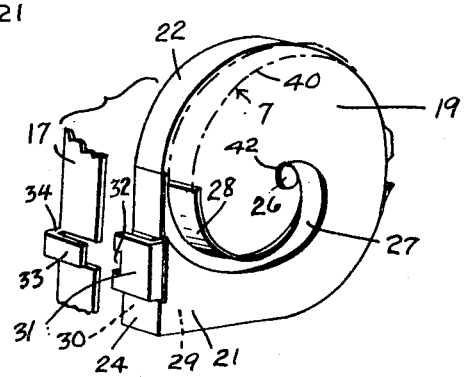
Fig. 6.
Fig. 1.
INVENTOR.
JULIAN A. LINKS
BY Boyken, Mohler & Beckley
ATTORNEYS.

Patented June 22, 1948

2,443,708

UNITED STATES PATENT OFFICE 2,443,708

ENDLESS FILM MAGAZINE AND PROJECTOR

Julian A. Links, San Francisco, Calif.

Application February 12, 1946, Serial No. 647,170

11 Claims. (Cl. 88—18.7)

This invention relates to an endless film magazine and to the combination thereof with a projector.

The magazine of this invention is intended for use on a projector of the type shown in my United States Letters Patent No. 2,419,961, dated May 6, 1947, in which the coil of film is enclosed in a container with a loop thereof extending from the center of the coil to the outside of the coil, which loop is outside the container and is moved past the projection lens for projection of the image therefrom.

While the magazine or container for film may be rigid with the projector, except for a cover on the container for loading the same, it has been found that children and others, sometimes have difficulty in changing the film.

One of the objects of this invention is the provision of a container for an endless reel of film that is adapted to be removed from the projector with the coil retained therein or which may be placed on the projector with equal facility. In other words, the container or magazine will hold the film therein in a coil against tangling or unwinding with a length of the film extending between the center of the coil and the outside thereof exposed for threading on the projector.

Another object of the invention is the provision of a magazine for endless film that is adapted to hold the main body of the coil of such film relatively loosely therein and with a length thereof extending between the inside and outside of the coil exposed for threading on a projector and guided by means on the magazine for proper winding and unwinding from the coil substantially free from resistance and which magazine is quickly separable from the projector and quickly replaced therein.

A still further object of this invention is the provision of a magazine for endless film and means for quickly placing such magazine on a projector and quickly removing it therefrom with the film carried thereby in a position for use, and which means is adapted to position the magazine close to the face plate on the projector so as to receive the film directly from said face plate.

Other objects and advantages will appear in the description and claims.

In the drawings,

Fig. 1 is a perspective view of a magazine illustrative of the invention separate from the projector and with the exposed portion of the film indicated in dot-dash lines. A fragment of the projector is indicated adjacent the magazine to clearly illustrate a part of the cooperating means on the magazine and projector for releasably holding the magazine stationary on the projector.

Fig. 2 is a perspective view of the magazine with the cover removed and with a loop of the film (indicated in dot-dash lines) extended for threading on the projector.

Fig. 3 is a perspective view of the projector frame and parts therein with the film pressure plate slightly offset to more clearly show the withdrawn position of the tooth that is adapted to move the film when the magazine is attached to the projector frame. The position of the film across the face plate is indicated in dot-dash lines.

Fig. 4 is a perspective view of the magazine cover.

Fig. 5 is an edge view of the portion of the projector frame that is intended to hold the magazine.

Fig. 6 is an edge view of the magazine in a position relative to Fig. 5 for positioning on the projector frame.

In detail, the projector unit shown in Fig. 3 is similar to the unit shown in my said United States Patent No. 2,419,961, and includes a frame generally designated 1, that is in the form of a vertical plate carrying a projection lens (not shown) in a barrel 2 for projection of the light rays through apertures 3, 4 in the vertical face plate 5 and pressure plate 6. The latter is indicated offset relative to the face plate, and dot-dash lines 7 show the intended position of the film in passing between the face plate and pressure plate when the latter is in relatively close opposed position to the face plate.

A vertically and laterally movable tooth or finger 8 is carried on frame 1 for movement by rotation of cam 9 that is associated with said tooth. Upon such rotation the tooth 8 moves laterally through the aligned vertical slots 10, 11 in the face plate and pressure plate and engages in one of the conventional openings in a margin of film 7 (not shown). Downward movement of the tooth follows said lateral movement, thus moving the film 7 downwardly, and then the tooth again moves laterally out of slots 10, 11 and away from the film and then vertically to the position shown in Fig. 3 preparatory to repeating the cycle.

Cam frame 12 encloses cam 9 and has arms 13 projecting therefrom. The tooth 8 projects from one side of frame 12, while arms 13 project from the opposite side. The arms move simultaneously with the tooth and a projection 14 on one of said arms is adapted to cooperate with a stationary projection 15 on the projection frame 1 to indicate to the operator the position of tooth 8. When the projections 14, 15 are one over the other the tooth 8 is out of the film and the same can be removed or replaced without danger. If the tooth is not out of the film and an attempt is made to remove it, the same may be seriously injured or scratched.

The elements above described, except for projections 14, 15 (which may be merely indicating marks) are substantially identical with the elements shown and described in my said co-pending application.

In the present invention the projector frame 1 is provided with a downward extension 16 coplanar therewith, and which extension includes a vertical flange 17 projecting from the vertical edge thereof, and horizontal flange 18 projecting from the lower horizontal edge.

The film magazine of this invention is removably carried on said extension 16 and means is provided along flange 17 and on said extension, as will later be described, for releasably holding the magazine.

The magazine itself comprises a generally drum-like container having opposed end walls 19 (Fig. 1) and 20 (Fig. 2).

The end wall 19 is the cover for the magazine and is substantially circular, except for a tangentially extending portion 21 (Fig. 4), and is formed with a flange 22 extending at right angles thereto. Flange 22 also extends at 23 along the tangential portion 21, and at the end of the section 23 of the flange there is a small flange extension 24 disposed at right angles to section 23.

The main body of the magazine corresponds substantially to the outline of the cover (Fig. 2) and is formed with a flange 25 extending around the circular portion of the end wall 20. A hollow post 26 is secured to said end wall 20 centrally thereof and projects into the magazine. The end of the post that is secured to wall 20 opens outwardly of said wall while the opposite end extends into one end of a slot 27 (Figs. 1, 4) in the end wall, or cover, 19 of the magazine.

Secured to post 26 is a film guide track or strip 28. One end of said guide track commences at the post to which said end is secured, and said end is disposed between the end walls 19, 20 of the magazine. The strip or guide track extends arcuately from said post through said slot 27 and generally radially of the magazine to a point adjacent the periphery of the latter and at which point the end of the track is outside the wall 19. The slot 27 generally follows the longitudinal contour of the track, except that the slot is wider than the thickness of the track and the concave side of said track substantially engages one side of the slot 27, while the convex side of the track is substantially spaced from the side of the slot that is adjacent thereto. In passing from the post 26 through slot 27 to the periphery of the magazine, the track 28 extends spirally as well as radially of the magazine.

The flange 25 on end wall 20 is adapted to telescopically fit within flange 19 of the cover or opposite end wall 19. A projection 29 extending radially outwardly of flange 25 may be formed integrally with flange 25 if desired, particularly where the wall 20 and flange 25 are molded from composition material, such as one of the plastic materials. Projection 29 is formed to provide a right angle outer corner (Fig. 2) with one side extending horizontally and tangentially of the flange 25 and the other side 30 extending vertically. The horizontal side is adapted to engage the flange section 23 of flange 22, while the flange extension 24 fits against the portion of side 30 that is adjacent said horizontal side.

On side 30 is a flat rectangular lip 31 that is parallel with said side 30 and spaced therefrom, which lip is secured along one vertical edge to said side 30 adjacent the wall 19. The opposite vertical edge of lip 31 is centrally formed with a rectangular notch 32. Thus the lip 31 is spaced from said side along the edge that has notch 32 whereby a strip of material may be slid between the lip and side 30, there being sufficient resiliency in the lip to permit the same to yieldably and frictionally engage such strip.

The flange 17 on extension 16 of the projector frame is the strip that is adapted to be received in the space between lip 31 and face 30 of projection 29. Said flange is formed with a relatively narrow spring strip 33 that is connected at one end 34 to flange 17 (Figs. 1, 3, 5) and the lip 31 is adapted to pass between said strip and flange when the said flange is between lip 31 and side 30. The end 34 of strip 33 is adapted to fit in notch 32. In this manner the magazine is adapted to be frictionally secured to extension 16 of the projector frame and as further security, a post 35 on said extension is adapted to be telescopically received in the hollow post 26 at the same time. The magazine may be quickly and easily secured to the projector frame by the foregoing means, and may be as easily removed therefrom.

The side of the magazine opposite the lip 31 comprising flanges 22, 25, are respectively cut away at 36 (Fig. 4) and 37 (Fig. 2) to provide an inlet aperture for admission of film 7 to the outer coil of a reel of said film when such coil is within the magazine, while the slot 27 provides an opening through which the film is withdrawn from the inside coil of such reel. While only a single coil is indicated in Fig. 2 within the magazine, a magazine of only several inches in diameter is adapted to hold substantially 25 feet of film with sufficient looseness so that upon drawing one end of the loop 40 (Fig. 2) of the film 7 through the slot 27 by means of tooth 8, the film will automatically move through the registering inlet opening in flanges 19, 20, and into the magazine. In this manner the endless film will automatically rewind itself in the magazine as it is moved past the projection lens.

Flange 25 is formed adjacent the cut out 37 with a pair of parallel ears 41 (Fig. 2) between which film 7 is adapted to pass just before it passes into the magazine. The flange 22 of the cover is formed with a larger cut out at 36 than the cut out 37 so that one free edge of the flange 22 terminates just above ears 41. The opposite free edge of flange 22 at cut out 36 is preferably curved outwardly slightly to provide a guide lip for helping to guide film 7 through the cut outs or inlet aperture into the magazine.

The lip 31 and strip 33 and the post 26 are positioned for supporting the magazine in a position so that the ears 41 on the magazine are directly below the lower edge of the face plate 5 of the projector and in a position so that the film of the loop passing downwardly between the face plate 5 and pressure plate 6 will pass directly between said ears and into the magazine.

In actual practice, and before positioning the magazine on the projector, the loop 40 of the film 7 closely follows the periphery of the magazine as seen in Fig. 1. In this manner the magazine is adapted to be stored away with the film in it, or handled freely without injury to the loop. However, when the magazine is to be inserted on a projector, the loop 40 is pulled out, as seen in Fig. 2, to enclose the projection lens and other elements of the projector within its confines, and for positioning a section of the loop between the face plate and pressure plate, the tooth 8 being moved to retracted position at this time, as seen in Fig. 3.

Upon removal of the film from the projector, the cam 9 is actuated to move the tooth to the retracted position seen in Fig. 3 in which projections 14, 15 are aligned one over the other. Then the pressure plate may be moved slightly away from the face plate and as soon as the film is removed from between the face plate and pressure plate the magazine can be removed. The loop is then shortened to the form indicated in Fig. 1, and the magazine is stored away, or if desired, the cover which includes end wall 19 may be removed and a new film inserted in the magazine. However, ordinarily a magazine is provided for each reel, and by the means herein described, the magazines may be readily replaced after a showing.

In order to facilitate the guiding of the loop 40 through the slot or opening 27, the hollow post 26 may be formed at its end that is in said slot with a slight flange 42, although this is not absolutely necessary.

The free outer end of the guide track 28, and post 26 and the cut outs 36, 37 for forming the film inlet may be substantially in horizontal alignment across the magazine, with the track 28 curving downwardly between its said free end and post 26. This is the preferred position of these elements when the magazine is in use, and the magazine itself, is below the projector elements and is in a vertical plane.

It is to be understood that the detailed description and drawings are not to be considered restrictive of the invention, but merely illustrative of a preferred form.

I claim:

1. A device for holding a coiled endless film on a projector during projection of the same and for storage before and after such projection comprising a relatively flat container for enclosing a coil of said film having a pair of spaced opposed end walls and narrow side walls extending between the edges of said end walls, one end wall of said pair being formed with an opening extending generally spirally outwardly from the center thereof for withdrawal of film from the center of said coil therethrough, an inlet formed in one of said side walls for return of film withdrawn from said opening to the outside of such coil, and guide means carried by said container as a unit therewith and extending through said opening for guiding the film withdrawn through said opening along an arcuate path of travel extending from the center of said one end wall toward its periphery, and means for releasably securing said container on a projector.

2. A device for holding a coiled endless film on a projector during projection of the same and for storage before and after such projection comprising a relatively flat container for enclosing a coil of said film having a pair of spaced opposed end walls and narrow side walls extending between the edges of said end walls, one end wall of said pair being formed with an opening extending from the center thereof generally radially outwardly for withdrawal of film from the center of said coil therethrough, an inlet formed in one of said side walls for return of film withdrawn from said opening to the outside of such coil, and a curved film track rigidly secured to one of said end walls and extending through said opening, said track extending generally longitudinally of said opening from the center of said one end wall substantially to the periphery of the same for guiding film withdrawn through said opening along an arcuate path of travel, and means for releasably securing said container on a projector.

3. A device for holding a coiled endless film on a projector during projection of the same and for storage before and after such projection comprising a relatively flat container for enclosing a coil of said film having a pair of spaced opposed end walls and narrow side walls extending between the edges of said end walls, one end wall of said pair being formed with an opening extending from the center thereof generally radially outwardly for withdrawal of film from the center of said coil therethrough, means for releasably securing said one end wall to said side walls, an inlet formed in one of said side walls one side of which is defined by said one end wall for return of film withdrawn from said opening to the outside of such coil, means for releasably securing said container to a projector for removal of said container as a unit from said projector, and means for holding said container including said opposed end walls stationary on such projector when so secured thereto.

4. A device for holding a coiled endless film on a projector during projection of the same and for storage before and after such projection comprising a relatively flat container for enclosing a coil of said film having a pair of spaced opposed end walls and narrow side walls extending between the edges of said end walls, one end wall of said pair being formed with an opening extending from the center thereof generally spirally outwardly for withdrawal of film from the center of said coil therethrough, an inlet formed in one of said side walls for return of film withdrawn from said opening to the outside of such coil, means for frictionally securing said container on a projector against movement thereof during said withdrawal of film therefrom but permitting removal of said container including said opposed end walls from said projector as a unit.

5. A device for holding a coiled endless film on a projector during projection of the same and for storage separate from the projector before and after such projection comprising a drum-like container having a pair of spaced opposed end walls and narrow side walls extending between their edges, one end wall of said pair being formed with an opening extending from its center generally radially outwardly thereof through its periphery, a curved track extending from the center of said container generally radially thereof through said opening for guiding film withdrawn from the center of a coil adapted to be enclosed in said container, an inlet formed in said side walls for returning film so withdrawn through said opening to the outside of such coil, one side of said inlet being defined by said one end wall, said track being secured to the other of said end walls, said one end wall being removable from said container, means for removably securing said latter end wall to said container, said container being adapted to carry such coil therein as a unit with a length of such coil extending through said opening and inlet at its ends, and means on said container adapted to cooperate with a projector for removably securing said container to such projector.

6. A device for holding a coiled endless film on a projector during projection of the same and for storage separate from the projector before and after such projection comprising a drum-like container having a pair of spaced opposed end walls and narrow side walls extending between their edges, one end wall of said pair being formed with an opening extending from its center generally radially outwardly thereof to substantially its periphery, a curved track extending from the center of said container generally radially thereof through said opening for guiding film withdrawn from the center of a coil adapted to be enclosed in said container, an inlet formed in said side walls for returning film so withdrawn through said opening to the outside of such coil, said track being secured to the other of said end walls, said one of said end walls being removable from said containers, means for removably securing said latter end wall to said container, said container being adapted to carry such coil therein as a unit with a length of such coil extending through said opening and inlet at its ends, and friction means on said container for frictionally securing said container stationary on a projector.

7. A device for holding a coiled endless film on a projector during projection of the same and for storage separate from the projector before and after such projection comprising a drum-like container having a pair of spaced opposed end walls and narrow side walls extending between their edges, one of the end walls of said pair being formed with an opening extending from its center generally radially outwardly thereof to substantially its periphery, a curved track extending from the center of said container generally radially thereof through said opening for guiding film withdrawn from the center of a coil adapted to be enclosed in said container, an inlet formed in said side walls for returning film so withdrawn through said opening to the outside of such coil, said track being secured to one of said end walls, one of said end walls being removable from said containers, means for removably securing said latter end wall to said container, said container being adapted to carry such coil therein as a unit with a length of such coil extending through said opening and inlet at its ends, and friction means on said container for frictionally securing said container stationary on a projector, said friction means including a hollow post coaxial with said container opening outwardly at one of its ends for receiving a male member of generally similar shape adapted to be carried by a projector.

8. A device for holding a coiled endless film on a projector during projection of the same and for storage separate from the projector before and after such projection comprising a drum-like container having a pair of opposed end walls respectively formed with flanges adapted to telescopically fit one within the other for providing narrow side walls extending between said end walls, said flanges being in frictional engagement for frictionally and releasably holding them together and for releasably securing said end walls in said opposed relation, one end wall of said pair being formed with an opening extending from the center thereof generally radially outwardly for withdrawal of film from the center of a coil adapted to be enclosed in said container, both of said flanges being similarly cut away at a corresponding point for providing an aperture for return of film so withdrawn to the outside of such coil, guide means carried by the other end wall of said pair extending through said opening for guiding film so withdrawn along an arcuate path.

9. A device for holding a coiled endless film on a projector during projection of the same and for storage separate from the projector before and after such projection comprising a drum-like container having a pair of opposed end walls respectively formed with flanges adapted to telescopically fit one within the other for providing narrow side walls extending between said end walls, said flanges being in frictional engagement for frictionally and releasably holding them together, and for releasably securing said end walls in said opposed relation, one end wall of said pair being formed with an opening extending from the center thereof generally radially outwardly for withdrawal of film from the center of a coil adapted to be enclosed in said container, both of said flanges being similarly cut away at a corresponding point for providing an aperture for return of film so withdrawn to the outside of such coil, guide means carried by the other end wall of said pair extending through said opening for guiding film so withdrawn along an arcuate path, and guide means on said container for guiding film through said aperture.

10. A device for holding a coiled endless film on a projector during projection of the same and for storage separate from the projector before and after such projection comprising a drum-like container having a pair of opposed end walls respectively formed with flanges adapted to telescopically fit one within the other for providing narrow side walls extending between said end walls, said flanges being in frictional engagement for frictionally and releasably holding them together and for releasably securing said end walls in said opposed relation, one end wall of said pair being formed with an opening extending from the center thereof generally radially outwardly for withdrawal of film from the center of a coil adapted to be enclosed in said container, both of said flanges being similarly cut away at a corresponding point for providing an aperture for return of film so withdrawn to the outside of such coil, guide means carried by the other end wall of said pair extending through said opening for guiding film so withdrawn along an arcuate path, said first mentioned guide means including a post in said container coaxial therewith and said second mentioned guide means comprising a pair of spaced projections carried by the outermost of said flanges and extending radially outwardly of said container adjacent said aperture.

11. A device for holding a coiled endless film on a projector during projection of the same and for storage separate from the projector before and after such projection comprising a drum-like container having a pair of opposed end walls respectively formed with flanges adapted to telescopically fit one within the other for providing narrow side walls extending between said end walls, said flanges being in frictional engagement for frictionally and releasably holding them together and for releasably securing said end walls in said opposed relation, one end wall of said pair being formed with an opening extending from the center thereof generally radially outwardly for withdrawal of film from the center of a coil adapted to be enclosed in said container, both of said flanges being similarly cut away at a corresponding point for providing an aperture for return of film so withdrawn to the outside of such coil, guide means carried by the other end wall of said pair extending through said opening for guiding film so withdrawn along an arcuate path, said opening extending to the periphery of the end wall in which it is formed and across the flange carried by said end wall to the free edge thereof.

JULIAN A. LINKS.

REFERENCES CITED

The following references are of record in the file of this patent:

UNITED STATES PATENTS

| Number | Name | Date |
|---|---|---|
| 969,288 | Knott | Sept. 6, 1910 |
| 1,861,197 | Templeton | May 31, 1932 |
| 1,897,283 | Templeton | Feb. 14, 1933 |
| 2,272,413 | Links et al. | Feb. 10, 1942 |
| 2,273,274 | Krouse | Feb. 17, 1942 |
| 2,281,328 | Shapiro | Apr. 28, 1942 |

FOREIGN PATENTS

| Number | Country | Date |
|---|---|---|
| 134,713 | Austria | Sept. 25, 1933 |
| 261,640 | Great Britain | Nov. 25, 1926 |
| 401,590 | Great Britain | Nov. 16, 1933 |
| 406,868 | Great Britain | Mar. 8, 1934 |
| 422,588 | Great Britain | Jan. 15, 1935 |
| 763,287 | France | Feb. 12, 1934 |